(12) United States Patent
Matsubara

(10) Patent No.: US 7,974,980 B2
(45) Date of Patent: Jul. 5, 2011

(54) DATA PROCESSING DEVICE CAPABLE OF PERFORMING DATA TRANSMISSION IN A PREDETERMINED ACCESS METHOD

(75) Inventor: Takanobu Matsubara, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 1318 days.

(21) Appl. No.: 10/590,523

(22) PCT Filed: Feb. 22, 2005

(86) PCT No.: PCT/JP2005/002754
§ 371 (c)(1),
(2), (4) Date: Aug. 24, 2006

(87) PCT Pub. No.: WO2005/083579
PCT Pub. Date: Sep. 9, 2005

(65) Prior Publication Data
US 2007/0226253 A1    Sep. 27, 2007

(30) Foreign Application Priority Data
Feb. 27, 2004   (JP) .................................. 2004-053641

(51) Int. Cl.
*G06F 17/30*   (2006.01)
(52) U.S. Cl. ........................................ 707/769; 707/792
(58) Field of Classification Search .................. 707/769, 707/792
See application file for complete search history.

(56) References Cited

U.S. PATENT DOCUMENTS 5,418,950 A * 5/1995 Li et al. .......................... 715/781
5,778,373 A * 7/1998 Levy et al. ..................... 707/748
5,787,416 A * 7/1998 Tabb et al. ..................... 707/738
6,078,925 A * 6/2000 Anderson et al. ............. 707/784
6,202,063 B1 * 3/2001 Benedikt et al. .............. 707/765

(Continued)

FOREIGN PATENT DOCUMENTS
JP           09-134389 A        5/1997

(Continued)

OTHER PUBLICATIONS

Makoto Sonoda, 'Web Programming no Kiso', Nikkei Software, Nikkei Business Publications, Inc., Jun. 24, 2003, vol. 6, No. 7, pp. 41 to 43.

(Continued)

*Primary Examiner* — Don Wong
*Assistant Examiner* — Kim T Nguyen
(74) *Attorney, Agent, or Firm* — Birch, Stewart, Kolasch & Birch, LLP

(57) ABSTRACT

In a data processing device, an input form processing program is executed, and an input form obtaining unit obtains input form data for inputting data to be transmitted to a server. Transmission data processing description data included in the input form data and defining a method of accessing the server is passed from the input form obtaining unit to a transmission data processing unit, and UI description data displaying a user interface is passed to an UI processing unit. When the input data for each item included in the user interface is already input and stored, the UI processing unit extracts required input data from storing unit, and passes it to the transmission data processing unit via a data storing unit. The transmission data processing unit creates transmission data according to the defined access method and transmits it to the server.

14 Claims, 24 Drawing Sheets

U.S. PATENT DOCUMENTS

| | | | |
|---|---|---|---|
| 6,272,488 B1 * | 8/2001 | Chang et al. | 707/769 |
| 6,282,547 B1 * | 8/2001 | Hirsch | 715/207 |
| 6,457,018 B1 * | 9/2002 | Rubin | 707/742 |
| 6,505,209 B1 * | 1/2003 | Gould et al. | 715/854 |
| 6,539,396 B1 * | 3/2003 | Bowman-Amuah | 707/769 |
| 6,591,277 B2 * | 7/2003 | Spence et al. | 707/792 |
| 6,609,121 B1 * | 8/2003 | Ambrosini et al. | 707/763 |
| 6,618,732 B1 * | 9/2003 | White et al. | 707/769 |
| 2002/0023102 A1 | 2/2002 | Nishiyama et al. | |
| 2002/0103827 A1 * | 8/2002 | Sesek | 707/505 |
| 2002/0199183 A1 | 12/2002 | Taniguchi | |
| 2004/0030684 A1 | 2/2004 | Nakata et al. | |
| 2004/0073869 A1 * | 4/2004 | Douvikas et al. | 715/507 |

FOREIGN PATENT DOCUMENTS

| | | |
|---|---|---|
| JP | 10-283153 A | 10/1998 |
| JP | 11-306171 A | 11/1999 |
| JP | 2002-150207 A | 5/2002 |
| JP | 2002-288136 A | 10/2002 |
| JP | 2003-085075 A | 3/2003 |
| JP | 2003-150546 A | 5/2003 |
| JP | 2003-331157 A | 11/2003 |
| JP | 2003-345739 A | 12/2003 |
| JP | 2004-013210 A | 1/2004 |
| JP | 2004-013611 A | 1/2004 |
| KR | 2000-0054241 A | 9/2000 |
| KR | 2002-0020302 A | 3/2002 |

OTHER PUBLICATIONS

Hideki Aoki et al., 'X Forms Nyumon', Java World, vol. 7, No. 9, pp. 138-148.

Ogino, "Common Knowledge of IE & OE," The 23rd PC fan, Aug. 15, 2003, vol. 10, pp. 124-125.

* cited by examiner

FIG.7

```
1.   <xhtml>
2.   <head>
3.       <title>PRIZE COMPETITION ENTRY FORM</title>
4.   </head>
5.   <body>
6.       <form>
7.           <NAME> <br />
8.           (LAST NAME)<input type="text" name="last_name" /><br />
9.           (FIRST NAME)<input type="text" name="first_name" /><br />
10.          <SEX> <br />
11.          <input type="radio" name="sex" value="male" />MALE
12.          <input type="radio" name="sex" value="female" />FEMALE
13.          <AGE> <br />
14.          <input type="text" name="age" size="2" />YEARS<br />
15.          <MAIL ADDRESS> <br />
16.          <input type="text" name="mail" /><br />
17.          <ZIP CODE> <br />
18.          <input type="text" name="zip1" size="3" />-
19.          <input type="text" name="zip2" size="4" /><br />
20.          <ADDRESS> <br />
21.          <textarea name="address" cols="30" rows="2">
22.          </textarea>
23.      </form>
24.  </body>
25.  </xhtml>
```

FIG.8

Message Compose

PRIZE COMPETITION ENTRY FORM

<NAME>
(LAST NAME)
(FIRST NAME)

<SEX>
◉ MALE   ○ FEMALE

<AGE>
☐ YEARS

<MAIL ADDRESS>

<ZIP CODE>
☐ - ☐

<ADDRESS>

Options                    Select

FIG.9

${last_name},${first_name},${sex},${age},${mail},${zip1},${zip2},${address}

FIG.10

Message Compose

PRIZE COMPETITION ENTRY FORM

<NAME>
(LAST NAME) YAMADA
(FIRST NAME) TARO

<SEX>
◉ MALE  ○ FEMALE

<AGE>
31 YEARS

<MAIL ADDRESS>
taro@aaa.co.jp

<ZIP CODE>
545 − 8522

<ADDRESS>
22-22, NAGAIKE-CHO, ABENO-KU, OSAKA-SHI

Options     Select

FIG.11

| ATTRIBUTE NAME | VALUE |
|---|---|
| last_name | YAMADA |
| first_name | TARO |
| sex | male |
| age | 31 |
| mail | taro@aaa.co.jp |
| zip1 | 545 |
| zip2 | 8522 |
| address | 22-22, NAGAIKE-CHO, ABENO-KU, OSAKA-SHI |

FIG.12

YAMADA, TARO, male, 31, taro@aaa.co.jp, 545
, 8522, 22-22, NAGAIKE-CHO, ABENO-KU, OSAKA-SHI

FIG.13 http://www.AAA.co.jp/prize/ get
${message}

FIG.14

| URI SCHEME | METHOD | TRANSMISSION METHOD |
|---|---|---|
| http: | get | GET METHOD OF HTTP PROTOCOL (TRANSMITTED WITH ENCODED URL) |
| | put | PUT METHOD OF HTTP PROTOCOL |
| | post | POST METHOD OF HTTP PROTOCOL |
| mailto: | | SMTP PROTOCOL (HANDLING FILE (IF PRESENT) AS ATTACHMENT) |
| ftp | | FTP PROTOCOL |

FIG.16

```
1.   <xhtml>
2.   <head>
3.      <title>PRIZE COMPETITION ENTRY FORM</title>
4.   </head>
5.   <body>
6.      <form>
7.         <NAME> <br />
8.         (LAST NAME)<input type="text" name="last_name" /><br />
9.         (FIRST NAME)<input type="text" name="first_name" /><br />
10.        <SEX> <br />
11.        <input type="radio" name="sex" value="male" />MALE
12.        <input type="radio" name="sex" value="female" />FEMALE
13.        <AGE><br />
14.        <input type="text" name="age" size="2" />YEARS<br />
15.        <MAIL ADDRESS OF CELLULAR PHONE><br />
16.        <input type="text" name="mail" /><br />
17.        <ZIP CODE> <br />
18.        <input type="text" name="zip1" size="3" />—
19.        <input type="text" name="zip2" size="4" /><br />
20.        <ADDRESS> <br />
21.        <textarea name="address" cols="30" rows="2">
22.        </textarea>
23.     </form>
24.  </body>
25.  </xhtml>
```

FIG.17

Message Compose

PRIZE COMPETITION ENTRY FORM

<NAME>
(LAST NAME) YAMADA
(FIRST NAME) TARO

<SEX>
◉ MALE   ○ FEMALE

<AGE>
31 YEARS

<MAIL ADDRESS OF CELLULAR PHONE>
taro@aaa.co.jp

<ZIP CODE>
545 – 8522

<ADDRESS>
22-22, NAGAIKE-CHO, ABENO-KU, OSAKA-SHI

Options    Select

FIG.18

```
Message Compose

PRIZE COMPETITION ENTRY FORM

<NAME>
   (LAST NAME)  YAMADA
   (FIRST NAME) TARO

<SEX>
   ◉ MALE   ○ FEMALE

<AGE>
   31   YEARS

<MAIL ADDRESS OF CELLULAR PHONE>
   taro@bbbphone.ne.jp

<ZIP CODE>
   545 - 8522

<ADDRESS>
   22-22, NAGAIKE-CHO,
   ABENO-KU, OSAKA-SHI

Options                    Select
```

FIG.19

YAMADA, TARO, male, 31, taro@bbbphone.ne.jp, 545, 8522, 22-22, NAGAIKE-CHO, ABENO-KU, OSAKA-SHI

FIG.20

| ATTRIBUTE NAME | VALUE |
|---|---|
| last_name | YAMADA |
| first_name | TARO |
| | HANAKO |
| | JIRO |
| sex | male |
| | female |
| age | 31 |
| | 28 |
| | 25 |
| mail | taro@aaa.co.jp |
| | hanako@aaa.co.jp |
| | jiro@aaa.co.jp |
| zip1 | 545 |
| zip2 | 8522 |
| address | 22-22, NAGAIKE-CHO, ABENO-KU, OSAKA-SHI |

FIG.23

Message Compose

PRIZE COMPETITION ENTRY FORM

<NAME>
(LAST NAME)
(FIRST NAME)

<SEX>
◉ MALE  ○ FEMALE

<AGE>
YEARS

<MAIL ADDRESS>

<ZIP CODE>

<ADDRESS>

YAMADA, TARO
YAMADA, HANAKO
YAMADA, JIRO

Options  Select

FIG.25

```
1.    <xml>
2.    <registration>
3.        <name>
4.            <last>${last_name}</last>
5.            <first>${first_name}</first>
6.        </name>
7.        <sex>${sex}</sex>
8.        <age>${age}</age>
9.        <mail>${mail}<mail>
10.       <home>
11.           <zip>${zip1}-${zip2}</zip>
12.           <address>${address}</address>
13.       </home>
14.   </registration>
15.   </xml>
```

FIG.26

```
1.    <xml>
2.    <registration>
3.        <name>
4.            <last>YAMADA</last>
5.            <first>TARO</first>
6.        </name>
7.        <sex>male</sex>
8.        <age>31</age>
9.        <mail>taro@aaa.co.jp<mail>
10.       <home>
11.           <zip>545-8522</zip>
12.           <address>22-22, NAGAIKE-CHO, ABENO-KU, OSAKA-SHI</address>
13.       </home>
14.   </registration>
15.   </xml>
```

FIG.27

```
1.    xhtml>
2.    <head>
3.        <title>PICTURE POSTCARD CREATION FORM</title>
4.    </head>
5.    <body>
6.        <form>
7.            <PHOTOGRAPH><br />
8.            <input type="file" name="photo" accept="image/jpg" /><br />
9.            <MESSAGE><br />
10.           <textarea name="message" cols="30" rows="2">
11.           </textarea>
12.       </form>
13.   </body>
14.   </xhtml>
```

FIG.28

```
1.    <xhtml>
2.    <head>
3.        <title>PICTURE POSTCARD PREVIEW</title>
4.    </head>
5.    <body>
6.        <img src="${photo}"><br />
7.        ${message}
8.    </body>
9.    </xhtml>
```

FIG.29

Message Compose

PICTURE POSTCARD CREATION FORM

<PHOTOGRAPH>

[ REFERENCE ]

<MESSAGE>

Options                    Select

FIG.30

Message Compose

PICTURE POSTCARD CREATION FORM

<PHOTOGRAPH>

/picture/20040129.jpg

[ REFERENCE ]

<MESSAGE>

I APOLOGIZE FOR NOT WRITING. MY CHILD HAS GROWN AS YOU CAN SEE.

Options                    Select

FIG.31

| DATA IDENTIFIER | ATTRIBUTE NAME | TYPE | VALUE |
|---|---|---|---|
| postcard | message | CHARACTER STRING | I APOLOGIZE FOR NOT WRITING. MY CHILD HAS GROWN AS YOU CAN SEE. |
| | photo | FILE NAME | 20040129.jpg |

FIG.32

```
1.    <xhtml>
2.    <head>
3.        <title>PICTURE CARD PREVIEW</title>
4.    </head>
5.    <body>
6.        <img src="20040129.jpg"><br />
7.        I APOLOGIZE FOR NOT WRITING. MY CHILD HAS GROWN AS YOU CAN SEE.
8.    </body>
9.    </xhtml>
```

DATA PROCESSING DEVICE CAPABLE OF PERFORMING DATA TRANSMISSION IN A PREDETERMINED ACCESS METHOD

TECHNICAL FIELD

The present invention relates a data processing device, a data processing method and a data processing program product, and particularly relates to a data processing device, a data processing method and a data processing program product for performing data transmission.

BACKGROUND ART

In a conventional system formed of a plurality of client devices and a processing device such as a server that is connected to the client devices directly or over a network such as a Local Area Network (LAN), the client devices are used for entering required data and instructing execution of processing, and the processing device executes processing of relatively large loads as well as processing to be managed in a centralized fashion.

In this system, input forms corresponding to the processing device are generally distributed to the client devices. The client device displays a user interface described in the input form, and required data is entered according to the user interface. Data for transmission is created according to data production rules described in the input form, and is transmitted from the client device to the processing device according to a destination and a transmission method described in the input form.

Thus, the processing device in the conventional system distributes the input form that describes the user interface for data entry, a data structure and the data transmission method to the client devices, and this is performed for the purpose of receiving the data that is required for executing the processing and has a predefined data structure by the processing device from the client device in the predefined transmission method. The client device creates and transmits the data according to the input form.

WWW (Word Wide Web) system is a typical example of the above system. The WWW system uses the HTML (Hyper Text Markup Language) for describing a user interface to be displayed, a destination and a transmission method in an input form. In the WWW system, the client device obtains the input form that is described in the HTML and is prepared by the processing device, and transmits data based on data entered by the user to the processing device with a HTTP (HyperText Transfer Protocol).

In the above system, the client device creates the data and transmits it to the processing device, and the processing device executes the processing based on the received data. Generally, in this system, the client device is supplied with the input form that includes the user interface for data entry, the data structure expected by the processing device and the data transmission method, and the data creation and transmission are performed using the input form. For accurate and rapid execution of the data entry by the user, methods of performing data entry by reusing data that was once entered by the user have been proposed.

As an example of such methods, a patent reference 1 has disclosed the following item information input method. In this method, a database has stored input data and keywords described in an input form in a fashion correlated to each other, and input data that is retrieved from the data base as the data matching with the keyword is automatically entered for an input item of the input form. The keyword and the input data can be added to the database for registration. By employing the item information input method disclosed in the patent reference 1, the input data is automatically entered for the input item provided that the registration in the database is already performed, even when the client device uses a browser different in keyword format from that used by the processing device, or even when keywords other than those in the format are assigned to the input item of the input form.

Patent Document 1: Japanese Patent Laying-Open No. 11-306171

DISCLOSURE OF THE INVENTION

Problems to be Solved by the Invention

In the above system, however, the data structure expected in each processing device may be different from those of the other processing devices even when the entered data does not differ between them. Therefore, the item information input method disclosed in the patent reference 1 cannot deal with the above case where a difference is present between data structures transmitted to the processing devices, respectively.

In this case, each client device generally obtains the input forms prepared for the respective processing devices. A user must perform the data entry operation on each of the input forms prepared for the respective processing devices, resulting in a problem of complicated operations.

When the processing devices defines different data transmission methods, respectively, this likewise results in a problem that different operations are required for the input forms of the respective processing devices.

The invention has been made in view of the above problems, and it is an object of the invention to provide a data processing device, a data processing method and a data processing program product that can transmit data in a predetermined access method without performing complicated operations when data is to be transmitted to a different data processing device on a system for processing by the different data processing device.

Means for Solving the Problems

For achieving the above object, a data processing device according to an aspect of the invention includes a storing unit storing data; an access information obtaining unit obtaining access information for transmitting data to an other device; and a transmission data processing unit creating the data to be transmitted to the other device and transmitting based on the access information and the data stored in the storing unit.

According to another aspect of the invention, a data processing method includes a data obtaining step of obtaining data from a storage device; an access information obtaining step of obtaining access information for transmitting data to an other device; and a transmission data processing step of creating the data to be transmitted to the other device and transmitting based on the access information and the data obtained from the storage device.

According to still another aspect of the invention, a data processing program product for causing a computer to execute a data processing method for transmitting data to a different device, causing the computer to execute a data obtaining step of obtaining data from a storage device; an access information obtaining step of obtaining access information for transmitting data to an other device; and a transmission data processing step of creating the data to be transmitted to the other device and transmitting based on the access information and the data obtained from the storage device.

BRIEF DESCRIPTION OF THE DRAWINGS

FIG. 7 illustrates a specific example of UI description data.

FIG. 8 shows a specific example of a user interface.

FIG. 9 illustrates a specific example of transmission data processing description data.

FIG. 10 shows a specific example of the user interface filled in with user information.

FIG. 11 illustrates a specific example of input data extracted by a data saving unit 1313.

FIG. 12 is a specific example of transmission data to be transmitted to a server 2.

FIG. 13 illustrates a specific example of transmission data processing description data describing a transmission method and a destination.

FIG. 14 illustrates an example of description of the transmission method that can be included in the transmission data processing description data.

FIG. 16 illustrates another specific example of the UI description data.

FIG. 17 shows a specific example of the user interface in which input fields of respective input items were automatically filled in.

FIG. 18 shows a specific example of the user interface in which input data is corrected.

FIG. 19 illustrates a specific example of the transmission data.

FIG. 20 illustrates a specific example of input data in which a plurality of attribute values are correlated to an identifier indicating an attribute name.

FIG. 23 shows a specific example of the user interface displaying a menu.

FIG. 25 illustrates another specific example of the data processing description data.

FIG. 26 illustrates a specific example of the transmission data.

FIG. 27 illustrates a specific example of the UI description data.

FIG. 28 illustrates a specific example of transmission data processing description data.

FIG. 29 shows a specific example of the user interface.

FIG. 30 shows a specific example of the user interface in the state where data entry is completed.

FIG. 31 illustrates a specific example of a data format of each input data saved in storing unit 130.

FIG. 32 illustrates a specific example of the transmission data.

DESCRIPTION OF THE REFERENCE SIGNS 1 cellular phone, 2 service provision server, 110 communications unit, 120 controller, 130 storing unit, 140 input/output unit, 142 key code input device, 144 display, 146 microphone, 148 speaker, 149 camera, 1300 data analyzing program, 1310 input form processing program, 1311 input form data obtaining unit, 1312 UI processing unit, 1313 data saving unit, 1314 transmission data processing unit, 1315 event managing unit, 1320 audio data recording program, 1330 address book program, 1340 file obtaining program, 1350 image-taking program, 1360 text editing program, 1370 WWW browser program, 1380 mail program, 1390 FTP program

BEST MODES FOR CARRYING OUT THE INVENTION

Embodiments of the invention will now be described with reference to the drawings. In the following description, the same parts and components bear the same reference numbers and the same names, and achieve the same functions. Therefore, description thereof is not repeated.

Figure 1:
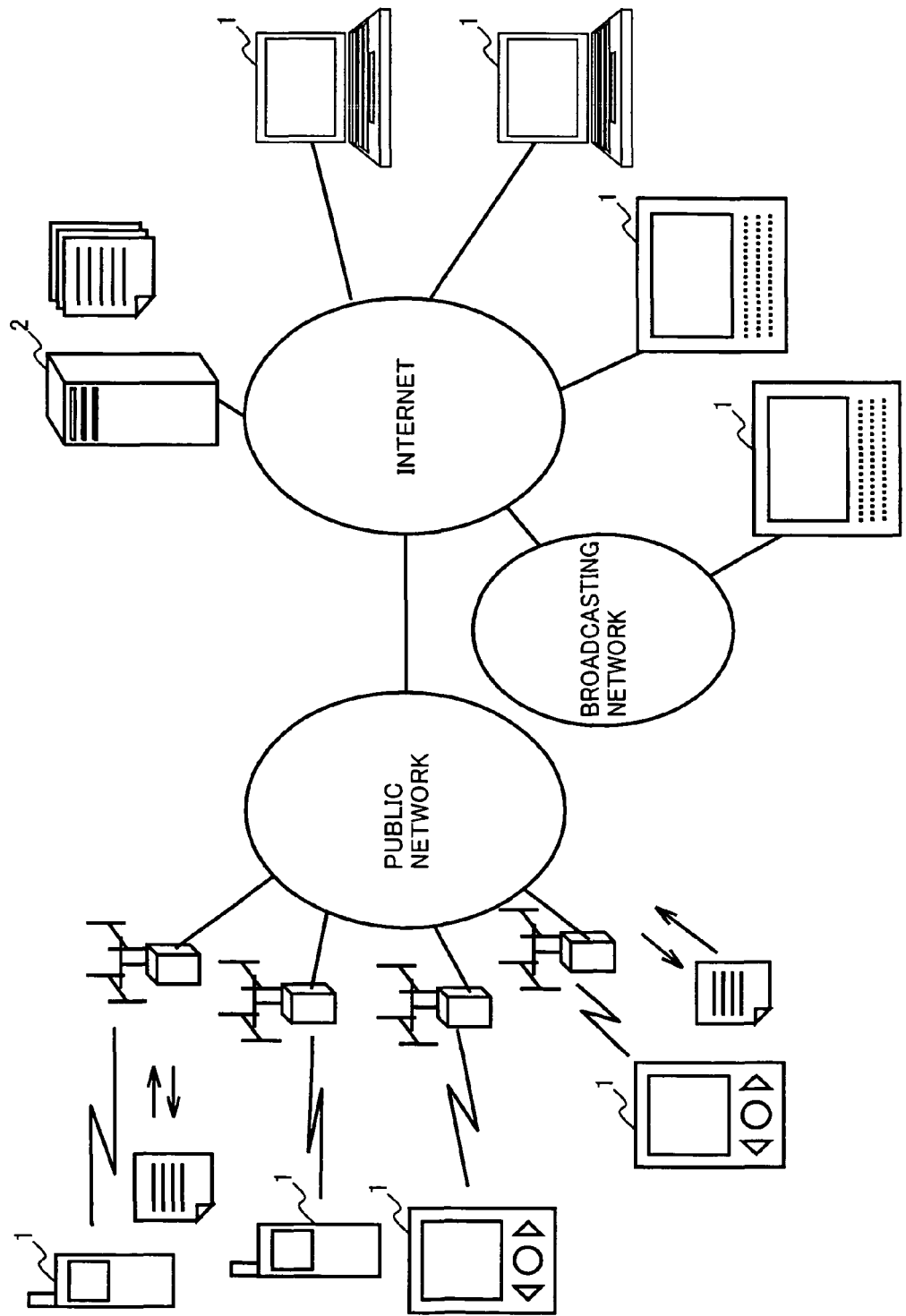
FIG. 1 shows a specific example of a structure of a data communications system according to an embodiment.

FIG. 1 shows a specific example of a data communications system according to an embodiment.

Referring to FIG. 1, the data communications system according to the embodiment includes a service provision server (which will be simply referred to as a "server" hereinafter) 2 and client devices 1. Server 2 and client devices 1 perform communications over the Internet, public network or broadcasting network. Although not shown in FIG. 1, server 2 and client devices 1 may perform communications over a dedicated line such as an LAN (Local Area Network), and may also perform radio communications.

Server 2 distributes input forms to client devices 1, receives data created by using the input forms from client devices 1 and thereby provides services executing processing based on the received data to client devices 1.

In this embodiment, server 2 distributes input forms for an entry for a prize competition to cellular phones 1 that are client devices 1, receives data that is created using the input forms and is transmitted from cellular phones 1, i.e., client devices 1, and thereby accepts entries for the prize competition from cellular phones 1.

Client device 1 obtains required data by using the input form provided from server 2, creates the transmission data, i.e., data for transmission and transmits it to server 2. As shown in FIG. 1, client devices 1 may be data processing devices having functions of transmitting and receiving the data, and specifically may be cellular phones, PDAs (Personal Digital Assistants), personal computers, television sets, facsimile machines and the like. In the following description, client device 1 is cellular phone 1.

In the following description, server 2 is a server for executing a service of accepting entries for a prize competition. However, server 2 is not restricted to a so-called server, and may be a data processing device such as a cellular phone, PDA, personal computer, television set, printer, copying machine or a facsimile machine that can perform transmission and reception of data in a predetermined data format, and can perform predetermined processing on the data.

Figure 2:
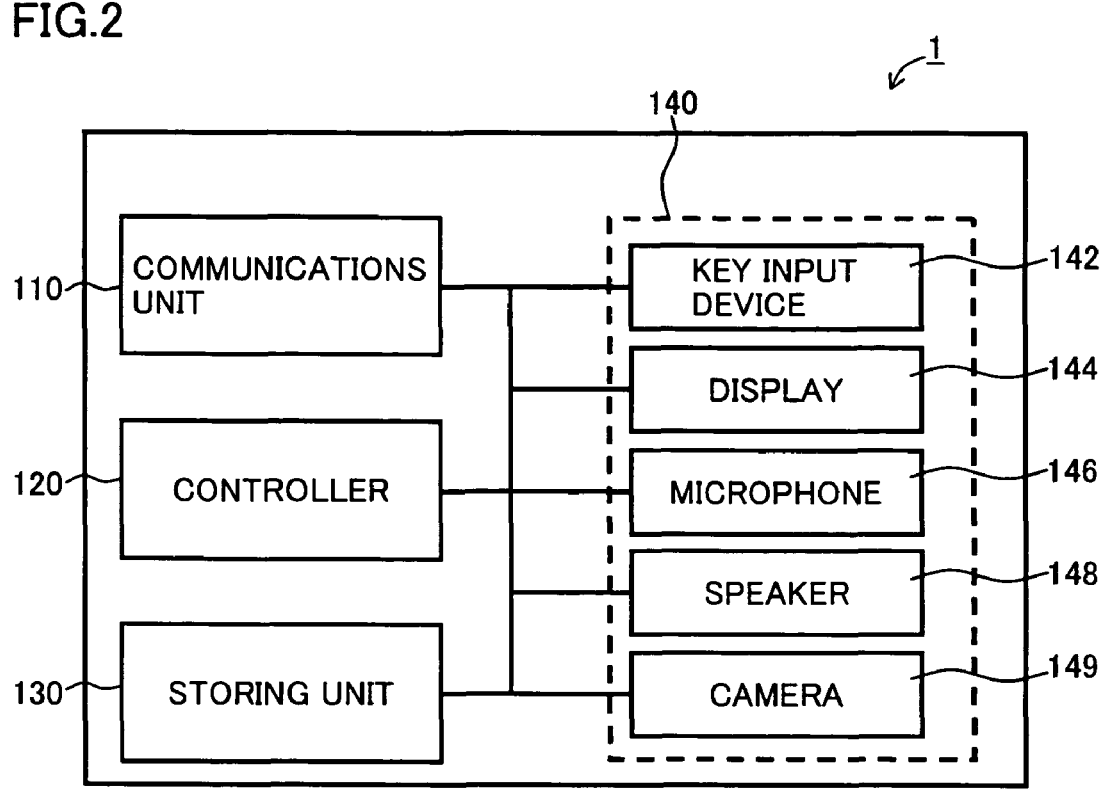
FIG. 2 shows a specific example of a hardware structure of a cellular phone 1 forming a client device 1.

FIG. 2 illustrates a specific example of a hardware structure of cellular phone 1 that is client device 1 included in this data transmission system.

Referring to FIG. 2, cellular phone 1 included in the data transmission system of the embodiment includes an input/output unit 140 that is an interface to a user, a controller 120 that is formed of a CPU (Central Processing Unit) or the like and entirely controls cellular phone 1, a communications unit 110 for communications with other devices and a storing unit 130 that is formed of a ROM (Read Only Memory) or a RAM (Random Access Memory), and stores programs to be executed by controller 120, intermediate data of the programs, data received from different computers and the like.

Input/output unit 140 includes a key code input device 142 including numeric buttons of "1", "2" and the like, direction buttons, e.g., of "L" and "R" and the like, a display 144 such as an LCD (Liquid Crystal Display) displaying information for a user, a microphone 146 taking in sounds, a speaker 148 outputting sounds and a camera 149 taking in images.

Controller 120 is internally provided with a timer.

Cellular phone 1 performs processing of displaying the input form obtained by the user from server 2 and creating the transmission data, and this processing is achieved by the hardware of cellular phone 1, software stored in storing unit 130 and executed by controller 120 and input form data. Operations of cellular phone 1 itself illustrated in FIG. 2 are well known.

Server 2 included in this data communications system is formed of a general personal computer and the like, and details of its structure will not be described.

Figure 3:
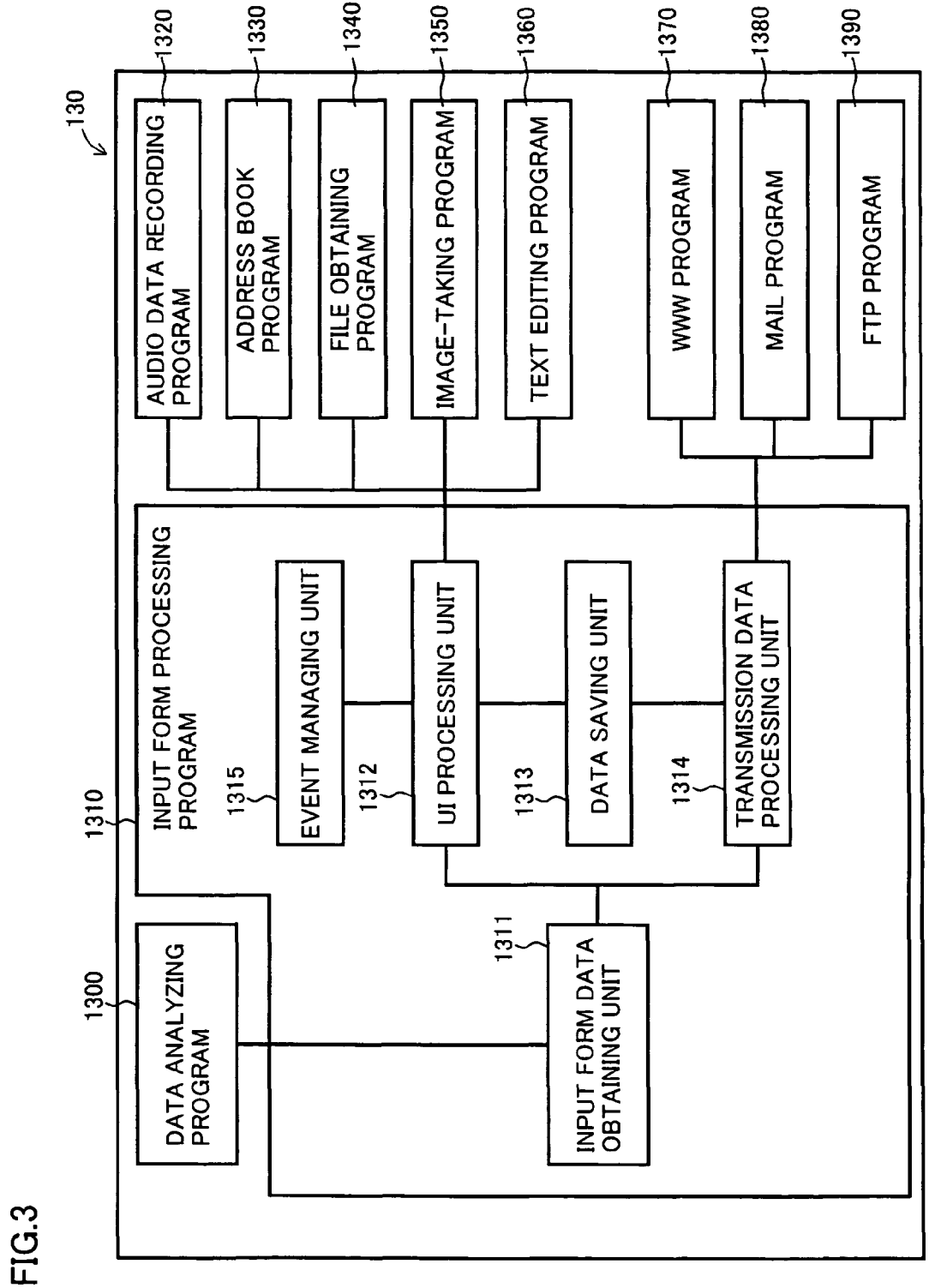
FIG. 3 illustrates a specific example of structures of respective programs stored in a storing unit 130 of cellular phone 1.

FIG. 3 illustrates a specific example of structures of various programs stored in storing unit 130 of cellular phone 1, and flow of the data processing in cellular phone 1 will now be described.

Referring to FIG. 3, the programs stored in storing unit 130 of cellular phone 1 include a data analyzing program 1300, an input form processing engine program 1310, an audio data recording program 1320, an address book program 1330, a file obtaining program 1340, an image-taking program 1350, a text editing program 1360, a WWW (World Wide Web) program 1370, a mail program 1380 and an FTP (File Transfer Protocol) program 1390.

Controller 120 executes the various programs stored in storing unit 130, and thereby the data processing illustrated in FIG. 3 is achieved in cellular phone 1.

More specifically, controller 120 executes data analyzing program 1300 in FIG. 3 to perform the processing of analyzing data received by communications unit 110, and determining whether it is the input form data or not.

When a result of the processing of data analyzing program 1300 indicates that the data received by communications unit 110 is input form data, controller 120 executes input form processing engine program 1310 to process the input form data received by communications unit 110. Functional structures of input form processing engine program 1310 will be described later.

Controller 120 executes audio data recording program 1320 based on the result of processing of input form processing engine program 1310, and thereby receives sounds provided through microphone 146 and various instructions provided from key code input device 142.

Controller 120 executes address book program 1330 based on the result of processing of input form processing engine program 1310, and thereby obtains mail addresses and telephone numbers stored in storing unit 130.

Controller 120 executes file obtaining program 1340 based on the result of processing of input form processing engine program 1310, and thereby obtains files stored in storing unit 130.

Controller 120 executes image-taking program 1350 based on the result of processing of input form processing engine program 1310, and thereby accepts the images provided from camera 149 and various instructions provided from key code input device 142. When movies are taken, controller 120 also accepts sounds provided from microphone 146.

Controller 120 executes text editing program 1360 based on the result of processing of input form processing engine program 1310, and accepts text information and various instructions provided from key code input device 142.

Controller 120 executes WWW (World Wide Web) program 1370 based on the result of processing of input form processing engine program 1310. Thereby, controller 120 accepts text information and various instructions provided from key code input device 142, and transfers the data via communications unit 110 to and from server 2.

Controller 120 executes mail program 1380 based on the result of processing of input form processing engine program 1310. Thereby, controller 120 accepts text information and various instructions provided from key code input device 142, and transmits a mail to server 2 via communications unit 110.

Controller 120 executes FTP (File Transfer Protocol) program 1370 based on the result of processing of input form processing engine program 1310. Thereby, controller 120 accepts text information and various instructions provided from key code input device 142, and transfers data to and from server 2 via communications unit 110.

The functional structures of input form processing engine program 1310 will now be described. The functional structures of input form processing engine program 1310 illustrated in FIG. 3 are achieved when controller 120 executes input form processing engine program 1310.

Referring to FIG. 3, the functions forming input form processing engine program 1310 include an input form data obtaining unit 1311, a UI (user interface) processing unit 1312, a data saving unit 1313, a transmission data processing unit 1314 and an event managing unit 1315.

Input form data obtaining unit 1311 analyzes the input form data received by communications unit 110, analyzes a syntax thereof and passes UI description data and transmission data processing description data included in the input form data to UI processing unit 1312 and transmission data processing unit 1314, respectively.

The UI description data is described in a predetermined language for displaying the user interface for data entry by the user on the display of the client device, and the transmission data processing description data describes access information defining the access method. The access method includes a data structure of the data transmitted from the client device to a specific server, a data description language, a transmission method and a destination. By using the transmission data processing description data, the data for transmission according to the access method is created and transmitted to a predetermined destination.

Event managing unit 1315 monitors occurrence of an event such as an event entered via key code input device 142, and analyzes the detected event to pass detected information indicating details of the event to UI processing unit 1312.

UI processing unit 1312 executes processing of displaying the user interface for data entry by the user on display 144 based on the UI description data of the input form data passed from input form data obtaining unit 1311. UI processing unit 1312 further operates according to detected information passed from event managing unit 1315 to execute audio data recording program 1320, address book program 1330, file obtaining program 1340, image-taking program 1350 and text editing program 1360, and thereby obtain data by each program. UI processing unit 1312 passes the obtained data to data saving unit 1313.

Data saving unit 1313 extracts required data from the data passed from UI processing unit 1312, and saves it in storing unit 130. For creating the transmission data, the data is passed to transmission data processing unit 1314.

Transmission data processing unit 1314 creates the data to be transmitted to server 2 based on the data passed from data saving unit 1313 and the transmission data processing description data of the input form data passed from input form data obtaining unit 1311, executes WWW program 1370, mail program 1380 or FTP program 1390 and transmits the created data to server 2.

This embodiment has been described in connection with the case where cellular phone 1 processes the input form provided from server 2. However, the input form data may be stored in storing unit 130 of cellular phone 1, in which case various units forming input form processing engine program 1310 illustrated in FIG. 3 function to process the input form data read and obtained from storing unit 130. The device providing the input form data is not restricted to server 2, and may be a device other than that shown in FIG. 1. Further, the input form data may be recorded for provision on a record medium such as a CD-ROM (Compact Disk-Read Only Memory) or a memory card.

The processing of the input form data by cellular phone 1 according to the embodiment will now be described with reference to a flowchart of FIG. 4. The processing illustrated in the flowchart of FIG. 4 is executed by such processing that controller 120 of cellular phone 1 reads input form data processing engine program 1310 having the structure illustrated in FIG. 3, and executes it to operate the respective units forming input form processing engine program 1310 illustrated in FIG. 3.

Figure 4:
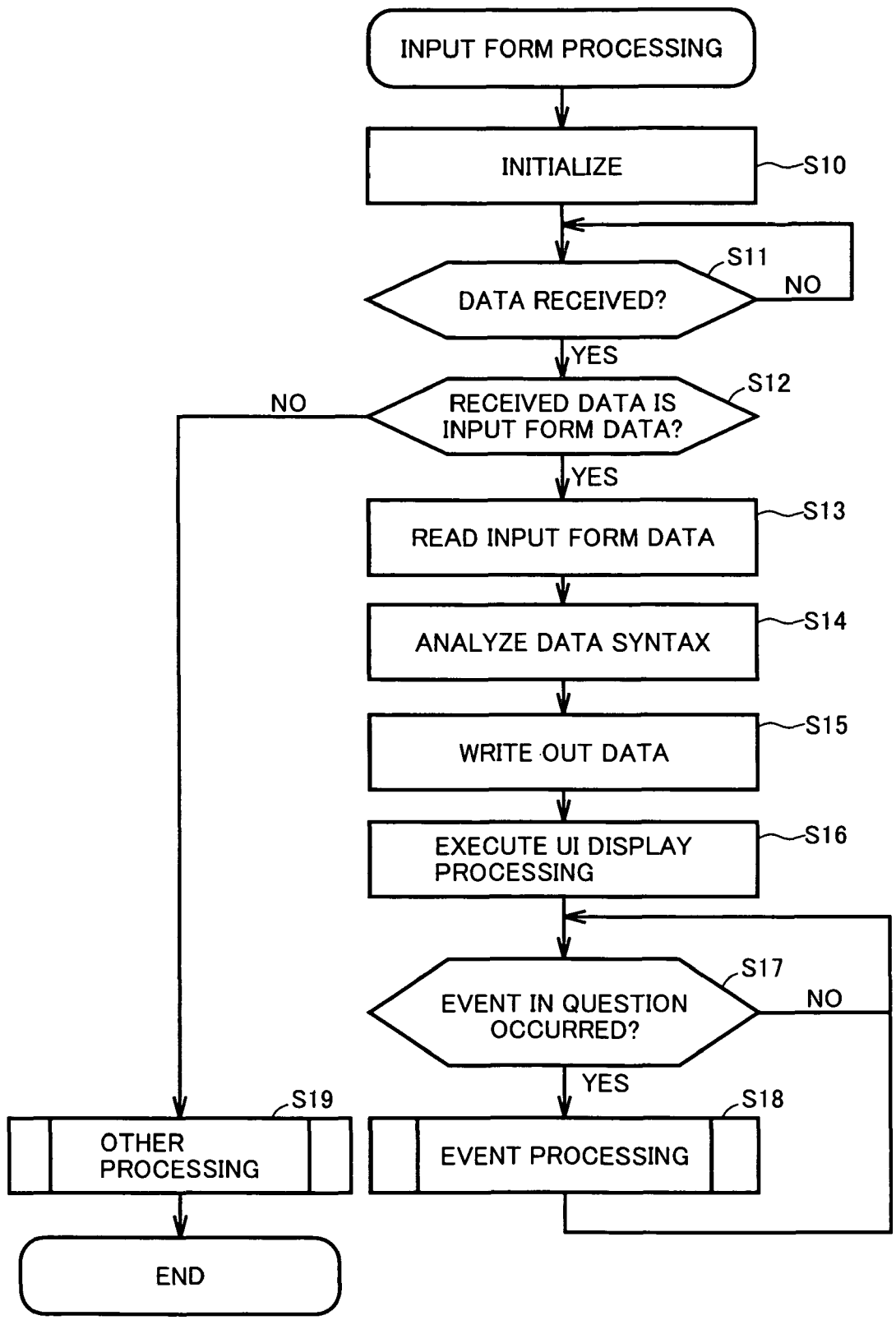
FIG. 4 is a flowchart illustrating processing of an input form data in cellular phone 1.

Referring to FIG. 4, when communications unit 110 receives the data from server 2 over the Internet (YES in step S11) after initialization was first executed (step S10), data analyzing program 1300 starts to analyze the data received in step S110, and it is determined whether the data is the input form data or not (step S12). When the received data is not the input form data according to the result of this determination (NO in step S12), the processing moves to step S19, and the program (not shown in FIG. 3) corresponding to the received data starts to execute the processing corresponding to the data.

When the received data is the input form data according to the result of determination in step S12 (YES in step S12), controller 120 starts input form data processing engine program 1310, and input form data obtaining unit 1311 reads the input form data (step S13). Input form data obtaining unit 1311 performs the syntax analysis on the input form data (step S14). The manner of the syntax analysis is not restricted in the invention, and may be a general syntax analyzing method depending on the used data description language.

After the syntax analysis in step S14, input form data obtaining unit 1311 writes the UI description data into UI processing unit 1312, and writes the transmission data processing description data into transmission data processing unit 1314 (step S15).

Based on the UI description data written out in step S15, UI processing unit 1312 performs the UI display processing (step S16) which is the processing of displaying the user interface for data entry by the user on display 144.

Then, event managing unit 1315 monitors occurrence of an event (step S17). The events of which occurrence is detected in step S117 correspond to events that are entered via key code input device 142. Particularly, these events include an operation of instructing the end of data entry for data transmission by the user as well as key operations of depressing buttons used as the user interface for starting the functions of audio data program 1320, address book program 1330, file obtaining program 1340, image-taking program 1350 and text editing program 1360. When the occurrence of event is detected in step S17 (YES in step S17), UI processing unit 1312 executes the processing corresponding to the detected event (step S18).

The processing corresponding to the event in step S18 is preferably configured as follows for the cases where the processing is interrupted by a speech communication program, or is suspended due to user's reasons or battery exhaustion. In these cases, the current position of reproduction or edition as well as the current state of changing are saved in storing unit 130 when interrupting the processing so that the processing can be resumed or restarted from the reproduction or editing position saved at the time of the interruption by reading the reproduction or edition position and the state of the last changing from storing unit 130.

The processing corresponding to the events executed in step S18 already described will now be described with reference to a flowchart of FIG. 5.

Figure 5:
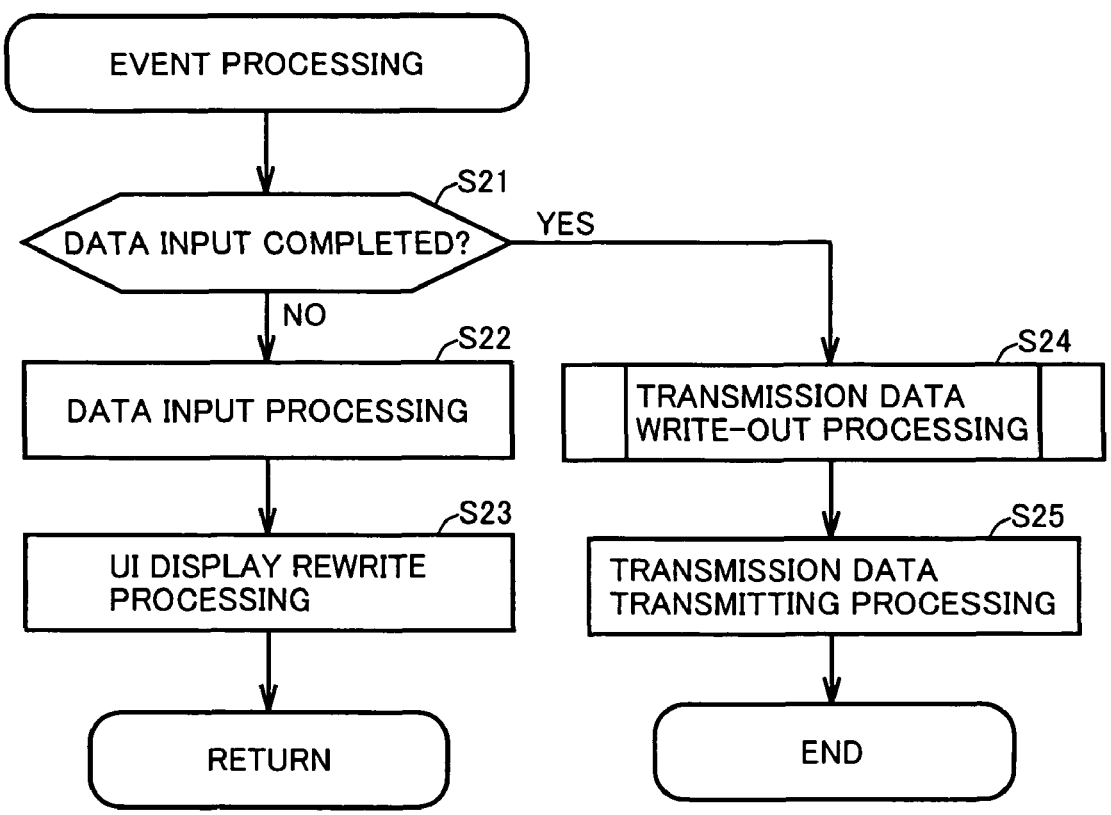
FIG. 5 is a flowchart illustrating processing corresponding to events in step S18.

Referring to FIG. 5, when event managing unit 1315 detects the occurrence of an event in step S17 already described, it analyzes details thereof, and detected information indicating the details of the event is transmitted to UI processing unit 1312.

When the event detected in step S17 is not the operation for instructing the end of the data entry, e.g., for performing the data transmission (NO in step S21), UI processing unit 1312 executes required programs 1320-1360 to execute the processing of the data input (step S22). The processing of rewriting the UI description data is performed based on the data provided in step S22 (step S23), and the process returns to step S17 in FIG. 4.

The data input processing executed in step S22 corresponds to the processing of executing the data input, which is specifically performed by text input to a text input field, password input to a password input form, selection from among options with check boxes, selection from among options with radio buttons and/or file selection by the file selecting function. In this embodiment, it is assumed that the data input processing is performed by describing the input data in the XHTML (eXtensible HyperText Markup Language) that is generally performed.

When the event detected in step S17 is an operation for instructing the ending of data input for performing, e.g., transmission (YES in step S21), UI processing unit 1312 passes the input data to data saving unit 1313 to save it in storing unit 130. Further, transmission data processing unit 1314 reads the data saved in storing unit 130, and executes the processing of writing out the transmission data, i.e., data for transmission (step S24). The transmission data write-out processing executed in step S24 will be described later.

Data transmission processing unit 1314 operates based on the transmission data written out in step S24 and the transmission data processing description data of the input form data, and thereby transmits the data from communications unit 110 to server 2 (step S25). Usually, the data transmitting processing in step S25 is executed by using the transmission function of WWW program 1370, mail program 1380 or FTP program 1390 which is started up by controller 120.

Through the above steps, cellular phone 1 completes the processing of the input form data.

The transmission data write-out processing executed in foregoing step S24 will now be described with reference to a flowchart of FIG. 6.

Figure 6:
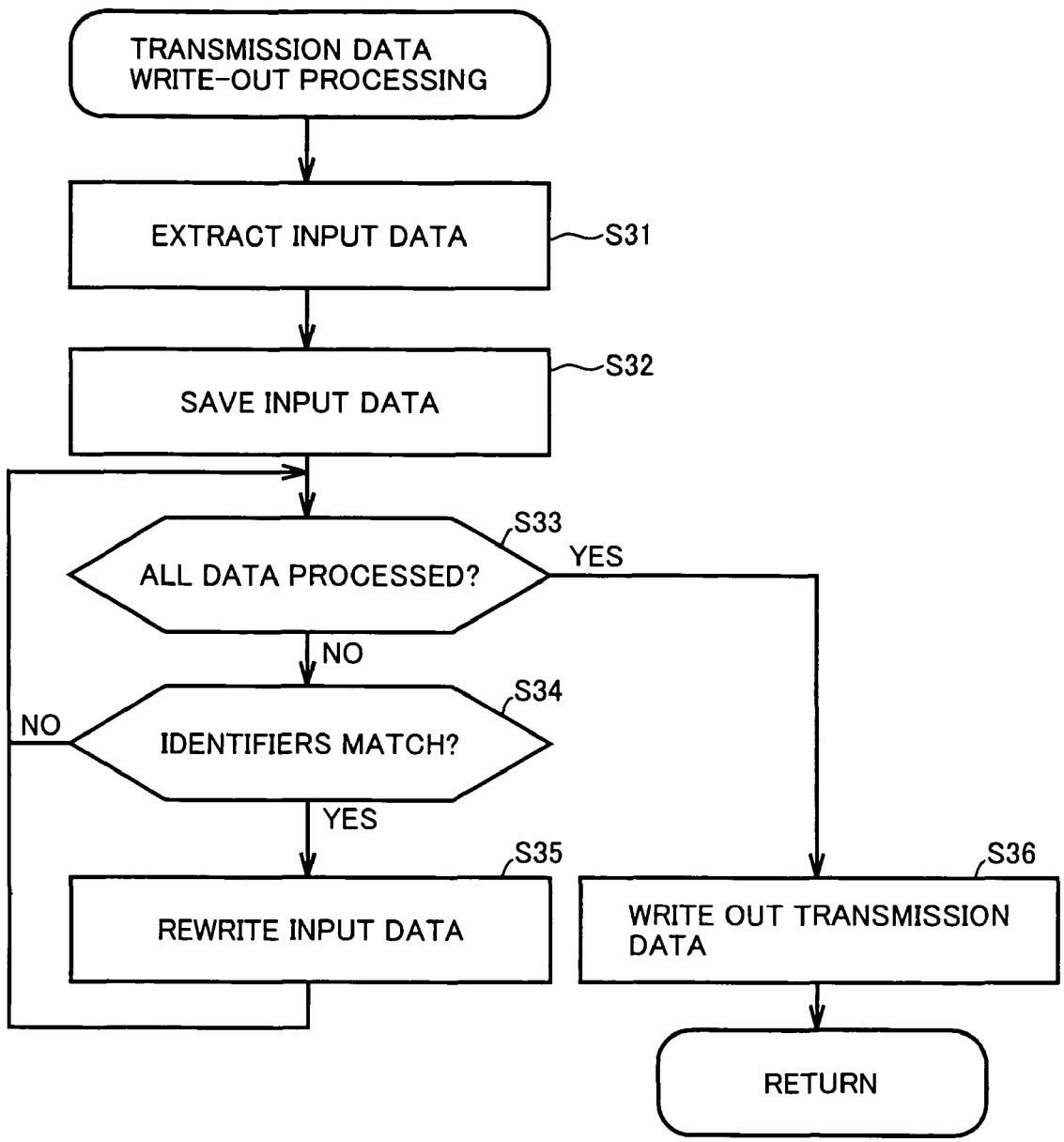
FIG. 6 is a flowchart illustrating transmission data write-out processing in step S24.

Referring to FIG. 6, UI processing unit 1312 extracts the data entered by the user from among the UI description data rewritten in step S23, and passes it to data saving unit 1313 (step S31). For example, when the UI description data is the data in the description format of XHTML, the data entered by the user in step S31 is extracted in the form data format, and is passed to data saving unit 1313.

Data saving unit 1313 analyzes the data passed from UI processing unit 1312, and extracts, from the data, the input data for each of the input items in such a format that an identifier indicating an attribute name of the input item is paired with an attribute value. In storing unit 130, the input data for each extracted input item is saved in data saving unit 1313, and is passed to transmission data processing unit 1314 (step S32).

In transmission data processing unit 1314, it is determined whether all the input data each corresponding to the input item and extracted in step S32 are used in the rewrite processing executed in step S35 or not (step S33). When there is unprocessed data (NO in step S33), transmission data processing unit 1314 determines whether the identifier indicating the attribute name included in the unprocessed input data matches with the identifier indicating the attribute name of the input item of the transmission data (i.e., data for transmission) described in the transmission data processing data of the input form data, or not (step S34).

When the identifier included in the data does not match with the identifier described in the transmission data processing data (NO in step S34), the process returns to step S33, and the processing is effected on another unprocessed data to determine whether the identifiers match with each other or not.

When the identifier included in the data matches with the identifier described in the transmission data processing data (YES in step S34), transmission data processing unit 1314 rewrites the attribute value indicated by the matching identifier into the unit of the corresponding input item of the transmission data (step S35). The process returns to step S33, and another unprocessed data is processed to determine the matching or mismatching of the identifiers.

When the result of determination in step S33 indicates that all the input data extracted in step S32 is used in the foregoing rewrite processing (YES in step S33), transmission data processing unit 1314 writes out the data for transmission (step S36), and the process returns to step S25 in FIG. 5.

The flow of the foregoing processing will be described with reference to specific examples of changes on screen and the input form data.

FIG. 7 illustrates a specific example of the UI description data included in the input form data provided from server 2.

The UI description data illustrated in FIG. 7 is employed for displaying the user interface for entering the user information such as a name, sex, age, mail address, zip code and address that are required for an entry for a prize competition. In this embodiment, as illustrated in FIG. 7, the input form data is in the HTML format, and the UI description data illustrated in FIG. 7 is general description data in the HTML format so that details thereof will not be described. FIG. 8 shows a specific example of the user interface which is displayed on display 144 of cellular phone 1 based on the UI description data illustrated in FIG. 7 for entering the user information.

As illustrated in FIG. 8, the UI description data illustrated in FIG. 7 includes, as the input items of the user information, "last name" and "first name" forming the "name", "male" and "female" which are options for "sex", "age", "mail address", "zip code" and "address". The UI description data illustrated in FIG. 7 describes that the input data of each of these input items is the following format. Thus, the attribute value that is the entered text data (or selected option) is paired with the identifier indicating the attribute name of the item in question.

FIG. 9 illustrates a specific example of the transmission data processing description data included in the input form data provided from server 2.

The transmission data processing description data illustrated in FIG. 9 is employed for creating the transmission data to be transmitted to server 2 based on the user information for an entry for a prize competition that is entered by the user using the user interface shown in FIG. 8.

The transmission data processing description data illustrated in FIG. 9 successively describes the identifiers that indicate the attribute names of the respective input items described in the UI description data, and describes the structure of the data for creating the transmission data by successively arranging the attribute values paired with the respective identifiers.

FIG. 10 shows a specific example of the state where the user completed the entry of user information through the user interface (FIG. 9) displayed based on the UI description data illustrated in FIG. 7. Thus, FIG. 10 shows the specific example of the state immediately before the user performs the operation for instructing the ending of data input in step S21 of the flowchart of FIG. 5. In this state, when the user performs the operation for instructing the ending of the data entry, e.g., by depressing a Select button (YES in step S21), the transmission data write-out processing is executed in step S24.

As already described, when the transmission data write-out processing starts in step S24, the processing of extracting the data entered by the user is executed in step S31 of the flowchart of FIG. 6. More specifically, UI processing unit 1312 extracts the input data as the data in the form data format, and passes it to data saving unit 1313, which decodes the extracted data. Data saving unit 1313 extracts, as the input data, pairs of the identifiers indicating the attribute names and the attribute values thereof from the extracted data passed from UI processing unit 1312 as illustrated in FIG. 11. Storing unit 130 saves the input data illustrated in FIG. 11. Also, it is passed to transmission data processing unit 1314.

More specifically, transmission data processing unit 1314 performs the processing of creating the transmission data in steps S33-S35 by extracting the identifier "last_name" from the input data illustrated in FIG. 11, and determining whether the transmission data processing description data includes a unit corresponding to a description "${last_name}" or not. Since the transmission data processing description data, of which specific example is illustrated in FIG. 9, includes the unit corresponding to the description "${last_name}", transmission data processing unit 1314 performs rewriting by replacing the above corresponding unit with a character string "YAMADA" that is the attribute value corresponding to the identifier "last_name" in FIG. 11.

Likewise, a description "${first_name}" included in the transmission data processing description data is replaced with a character string "TARO", and a description "${sex}" is replaced with an option "male". Also, descriptions "${age}", "${mail}", "${jip1}", "${jip2}" and "${address})" are replaced with character strings "31", "taro@aaa.co.jp", "545", "8522" and "OSAKA-SHI, ABENO-KU, NAGAIKE-CHO, 22-22", respectively.

In steps S33-S35, as described above, all the identifiers included in the transmission data processing description data, of which specific example is illustrated in FIG. 9, are replaced with the attribute values correlated to them in the input data, whereby the transmission data for transmission to server 2 is completed as illustrated in FIG. 12.

The access information described in the transmission data processing description data may include the transmission method and/or the destination as illustrated in FIG. 13, in addition to the data structure of the data for transmission illustrated in FIG. 9. The transmission data processing description data illustrated in FIG. 13 describes the data transmission method and the destination in the first line. More specifically, it is described to use the GET method of HTTP as the data transmission method, and also URL (Uniform Resource Locators) "WWW.AAA.co.jp/prize" is described as the destination. In this case, transmission data processing unit 1314 operates in step S25 to pass the required data to WWW program 1370 for encoding and transmitting the data to the designated URL.

FIG. 14 illustrates an example of description of the transmission method that can be included in the transmission data processing description data. As also illustrated in FIG. 13, the transmission method is described by the URI (Uniform Resource Identifier) and the Method in the first line. In a specific transmission method, as illustrated in FIG. 14, when the URI Scheme is "http:", "get", "put" and "post" can be designated as the Method, and each execute the data encoding corresponding to the method of the HTTP protocol for the transmission. When the URI Scheme is "mailto:", the data is transmitted with SMTP (Simple Mail Transfer Protocol), i.e., by an e-mail. When the transmission data includes a file, it is transmitted as an attachment. When the URI Scheme is "ftp:", the data is transmitted with FTP (File Transfer Protocol).

As described above, the input data extracted from the data entered by the user processed by data saving unit 1313 and the input data for each input item is saved in storing unit 130. Therefore, the UI display processing in step S16 can be executed such that UI processing unit 1312 extracts the corresponding identifier from the input data saved in data storing unit 130, and performs the UI display processing for displaying the user interface displaying the attribute values paired with the extracted identifier. Thereby, the user interface can be displayed reusing the data previously entered by the user.

For example, it is assumed that storing unit 130 stores the input data corresponding of each input item illustrated in FIG. 11. More specifically, FIG. 11 illustrates the input data for each input item that is previously entered with the input form data including the UI description data illustrated in FIG. 7 and the transmission data processing description data illustrated in FIG. 9. In this case, when UI processing unit 1312 receives the UI description data from input form data obtaining unit 1311 in step S15, the UI display processing illustrated in FIG. 15 is executed in step S16.

Figure 15:
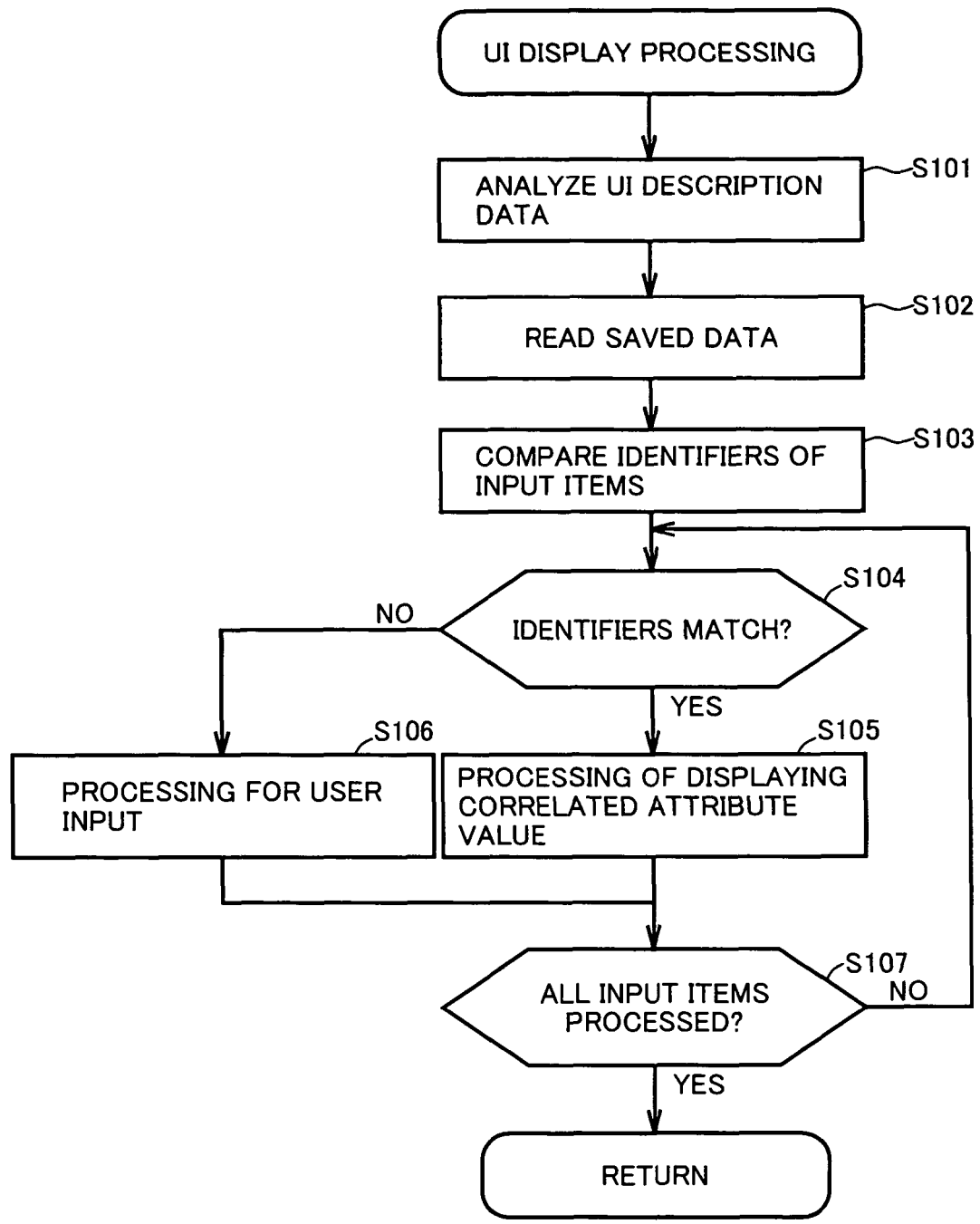
FIG. 15 is a flowchart illustrating UI display processing.

Referring to FIG. 15, UI processing unit 1312 analyzes the UI description data passed from input form data obtaining unit 1311 (step S101), and reads the input data saved in storing unit 130 (step S102). A comparison is made between the identifier indicating the attribute name of the input item described in the UI description and the identifier indicating the attribute name included in the input data read from storing unit 130 (step S103).

When a result of the comparison in step S103 indicates that the identifiers matching with each other are present (YES in step S104), processing is performed to display on display 144 the user interface that displays, in the input field of the input item of the matching identifier, the attribute value saved in storing unit 130 in the formed paired with the matching identifier (step S105). When the identifiers do not match, processing is performed to display on display 144 the user interface that displays an empty field for user entry or options in a selectable fashion related to the input item of the mismatching identifier (step S106). The above processing is successively effected on all the input items described in the UI description data (step S107).

More specifically, the processing is performed such that the attribute value "YAMADA" saved in storing unit 130 in a fashion paired with identifier "last_name" is input and displayed in the input field of the input item "last name" that is indicated by a description <input type="text" name="last_name"/> in the UI description data illustrated in FIG. 7.

The processing is also performed such that the attribute value "TARO" saved in storing unit 130 in the fashion paired with identifier "first_name" is input and displayed in the input field of the input item "first name" represented by a description <input type="text" name="first_name"/> in the UI description data.

For the selection input field using radio buttons for the input item "sex" that is represented by the descriptions of "<input type="radio" name="sex" value="male"/>" and <input type="radio" name="sex" value="female"/>" in the UI description data, the processing is performed to perform display by selecting "<input type="radio" name="sex" value="male"/>" corresponding to the attribute value "male" saved in storing unit 130 in the fashion paired with identifier "sex".

For the input field of the input item "age" represented by the description "<input type="text" name="age" size="2"/>" in the UI description data, the processing is performed to input and display the attribute value "31" saved in storing unit 130 in the fashion paired with the identifier "age".

For the input field of the first half of the input item "zip code" represented by the description "<input type="text" name="zip 1" size="3">" in the UI description data, the processing is performed to input and display the attribute value "545" saved in storing unit 130 in the fashion paired with the identifier "zip1". For the input field of the second half of the input item "zip code" represented by the description "<input type="text" name="zip2" size="4">" in the UI description data, the processing is performed to input and display the attribute value "8552" saved in storing unit 130 in the fashion paired with the identifier "zip2".

For the input field of the input item "address" represented by the description "<textarea name="address" cols="30" rows="2">" in the UI description data, the processing is performed to input and display the attribute value "OSAKA-SHI, ABENO-KU, NAGAIKE-CHO, 22-22" saved in storing unit 130 in the fashion paired with the identifier "address".

Thus, in the case where storing unit 130 has stored the input data illustrated in FIG. 11, the user interface shown in FIG. 10 is displayed in step S116. After the display of the user interface, the processing in and after step S17 is executed similarly to the manner already described.

When the user intends to transmit the data previously entered again to the same destination, a new data input operation is not required owing to execution of the above processing in cellular phone 1, and the user can easily transmit the data of the same details in the predetermined access method.

The input data saved in storing unit 130 can also be used for displaying the user interface with the UI description data different from the UI description data used for displaying the user interface that was used when the data was entered. In this display operation, it is possible to correct the input information displayed for the input item of the user interface.

FIG. 16 illustrates a specific example of the UI description data included in the input form data provided from server 2, and particularly illustrates data different from the UI description data illustrated in FIG. 7. More specifically, the UI description data illustrated in FIG. 16 includes the input item "mail address of cellular phone" instead of the input item "mail address" described in the UI description data illustrated in FIG. 7. However, both the UI description data bear the same file name "prize.html".

In this case, data saving unit 1313 operates in step S32 so that the identification information (e.g., file name) of the UI description data that was used when inputting this data is assigned to this input data, and this data is saved in storing unit 130. In step S101, UI processing unit 1312 obtains the identifier information by analyzing the UI description data passed from input form data obtaining unit 1311, extracts the input data bearing the identifier information of the UI description data in step S102 and thereby can determine that the data is reusable, The UI display processing with the UI description data illustrated in FIG. 16 is performed reusing the input data saved in storing unit 130, and thereby the user interface illustrated in FIG. 17 is displayed in step S16. More specifically, FIG. 17 shows a specific example of the user interface in the state where the UI display processing is performed reusing the input data for the respective input items shown in FIG. 11, and the input fields of the respective input items are automatically filled in.

Since the input item "mail address of cellular phone" of the user interface shown in FIG. 17 is automatically filled with an ordinary mail address that was entered in the input item "mail address" of the user interface shown in FIG. 8, the user corrects the input data in the input field of the input item "mail address of cellular phone" in FIG. 17 by entering the data as shown in FIG. 18. Cellular phone 1 executes the processing in and after step S17 according to the UI description data, and creates the transmission data illustrated in FIG. 19 for transmitting it to server 2.

By executing the above processing in cellular phone 1, the user can easily transmit the data in the predetermined access method without performing the operation of reentering the data previously entered even when the displayed user interface is different from that used for the previously input, provided that the currently displayed user interface contains the same input item(s) as the previously used user interface.

The input data saved in storing unit 130 may be configured such that a plurality of attribute values are correlated to the identifier indicating the attribute name as illustrated in FIG. 20.

Figure 21:
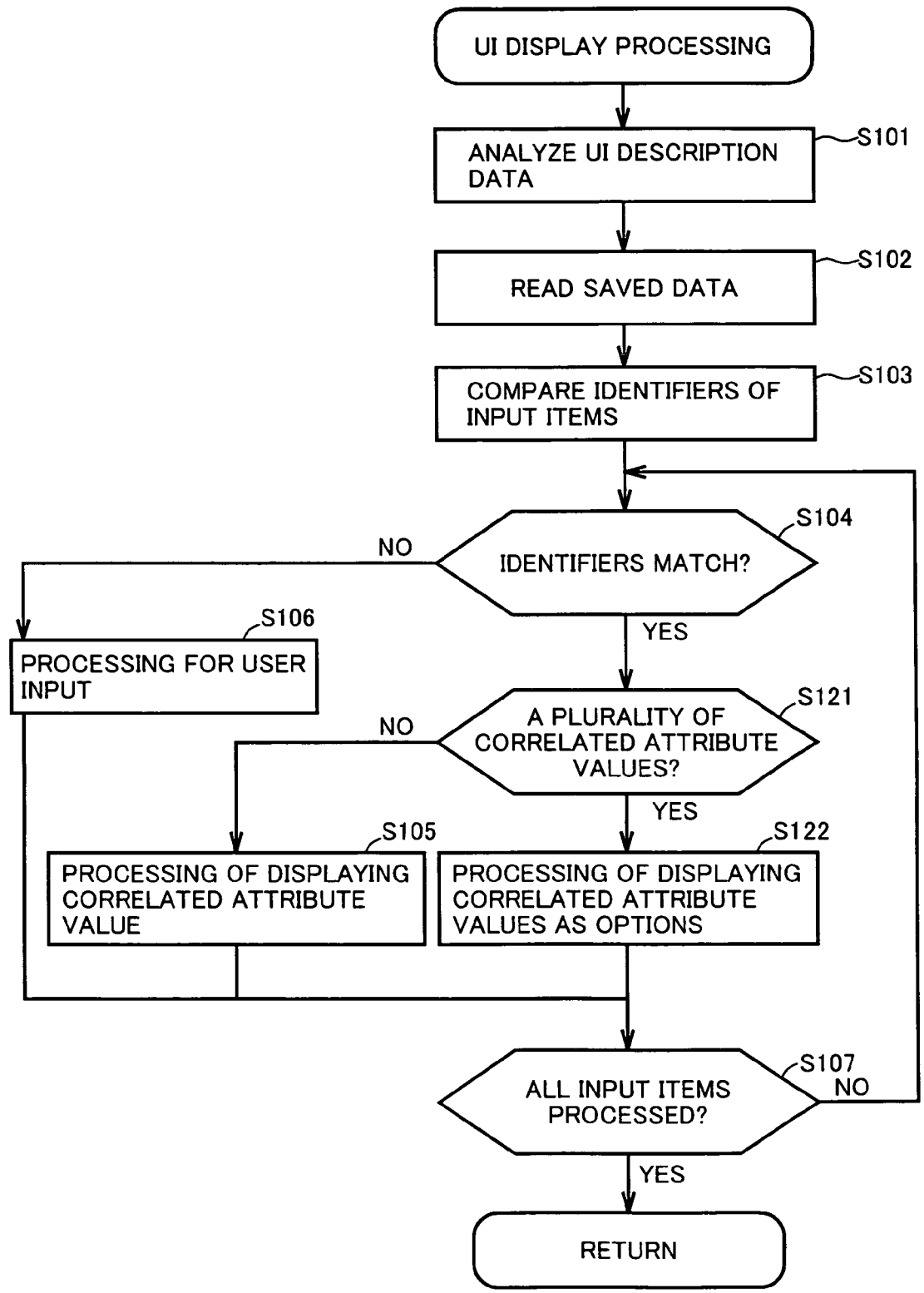
FIG. 21 is a flowchart illustrating UI display processing in the case where the input data saved in storing unit 130 is configured to correlate the plurality of attribute values to the identifier indicating the attribute name.

When the input data saved in storing unit 130 is configured such that a plurality of attribute values are correlated to the identifier indicating the attribute name, the UI display processing illustrated in FIG. 21 is executed in step S16.

Referring to FIG. 21, processing similar to that in steps S101-S103 illustrated in the flowchart of FIG. 15 is successively effected on all the input items described in the UI description data. When a result of the comparison in step S103 represents that the matching identifiers are present (YES in step S104), and further when the plurality of attribute values correlated to one identifier indicating the attribute name are extracted, the processing is performed in step S122 to display on display 144 the user interface representing the plurality of attribute values as options for each input item.

In step S16, display 144 displays the user interface representing the plurality of attribute values as options, and the user's selection is accepted in step S17.

More specifically, when the UI display processing is to be performed on the UI description data illustrated in FIG. 7 by reusing the input data saved in storing unit 130 and illustrated in FIG. 20, UI processing unit 1312 displays the user interface that represents a menu for selection of the plurality of attribute values "TARO", "HANAKO" and "JIRO" correlated to the identifier "first_name" in the input field of the input item "NAME" for selection by the user. The selected attribute value is automatically filled in the input field, and the processing in and after step S17 is executed.

Figure 22:
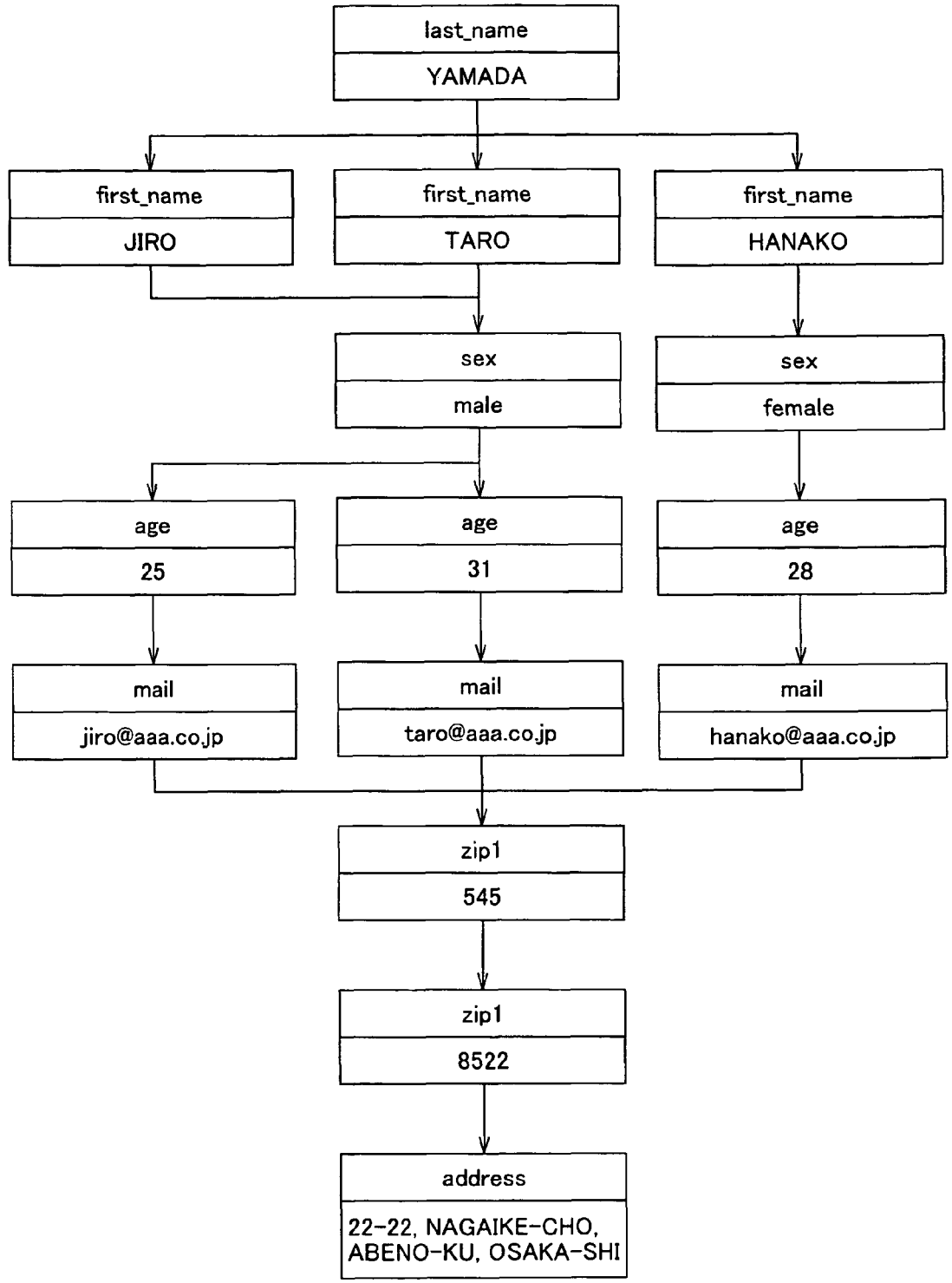
FIG. 22 illustrates a specific example of input data of a list structure.

The input data held in data storing unit 130 may have a list structure as illustrated in FIG. 22. According to the list structure of the input data, the input data previously entered by the user is handled such that the input data of the respective input items entered by one previous input operation is correlated as one set of data, and all the input data entered in the previous input operations are held as one list. FIG. 22 specifically illustrates the input data configured when the user performed the input operations at least three times.

When data storing unit 130 holds the input data of a list structure, display 144 displays in step S16 the user interface representing a menu of options of "YAMADA, TARO", "YAMADA, HANAKO" and "YAMADA, JIRO" as shown in FIG. 23, and accepts the user's selection in step S117. UI processing unit 1312 extracts a set of input data correlated to the selected option from the input data of the list structure, and automatically fills in the input field of the corresponding input item with the corresponding attribute value.

By executing the above processing in cellular phone 1, the user can easily transmit the data of the same details as the previously entered data in the predetermined access method only by performing a simple selecting operation without performing the input operation again when the data previously entered is to be transmitted to the same destination again.

Storing unit 130 may store in advance the transmission data processing description data, and may use, in the transmission data write-out processing in step S24, the transmission data processing description data saved in storing unit 130. Further, storing unit 130 may store the plurality of transmission data processing description data, or may use the selected transmission data processing description data in the transmission data write-out processing in step S24. When a plurality of pieces of the transmission data processing description data have been saved in storing unit 130, the transmission data write-out processing in step S24 is specifically executed by the manner in FIG. 24 instead of the manner illustrated in FIG. 6.

Figure 24:
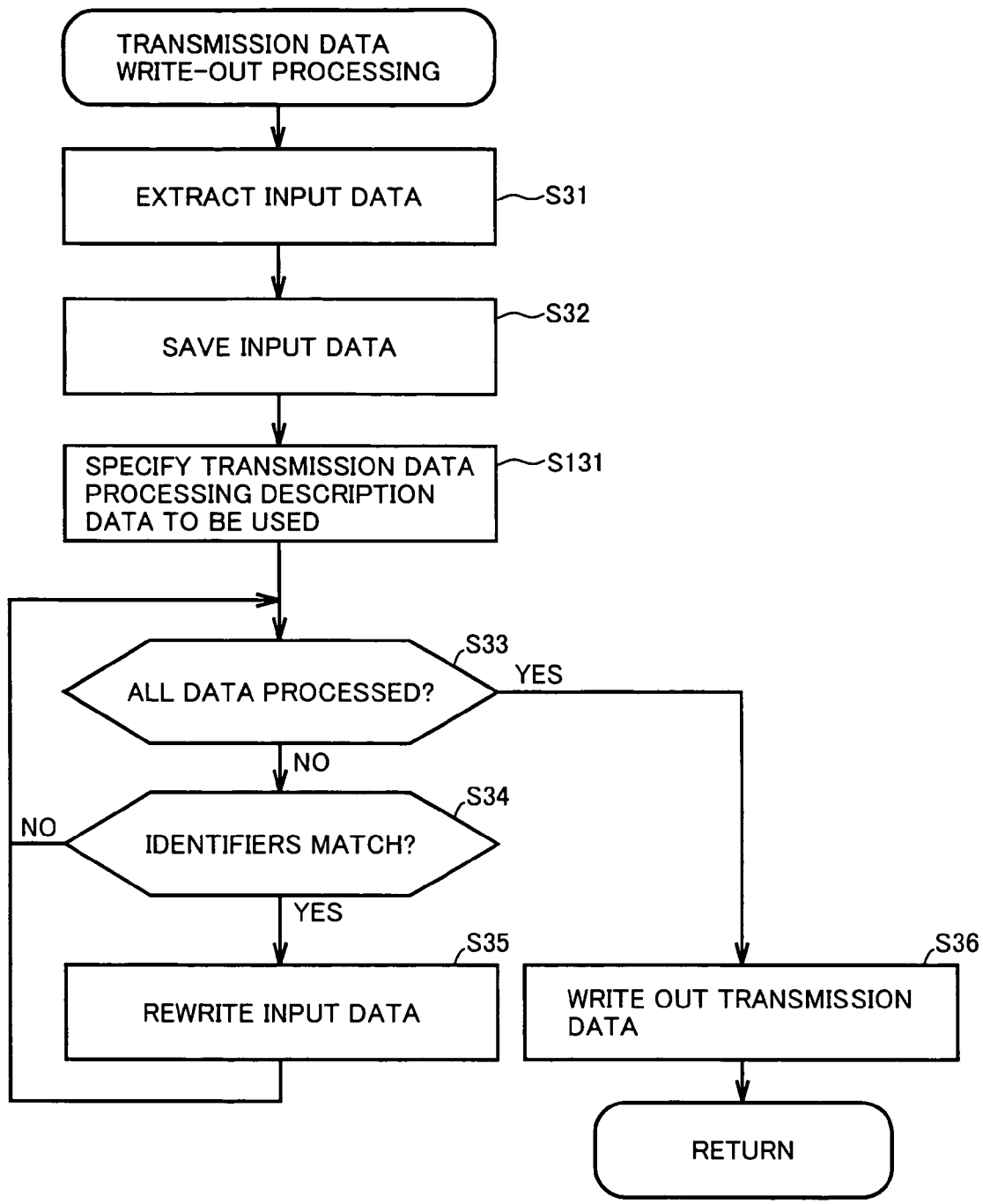
FIG. 24 is a flowchart illustrating transmission data write-out processing in step S24 executed when a plurality of transmission data processing description data is saved in storing unit 130.

As illustrated in FIG. 24, when the extracted input data for each input item is saved in storing unit 130 by data saving unit 1313 in step S32, and is passed to transmission data processing unit 1314, transmission data processing unit 1314 executes the processing of specifying or determining the transmission data processing description data to be used among the transmission data processing description data saved in storing unit 130 (step S131). In subsequent steps S33-S36, the transmission data processing description data specified in step S131 is used.

For example, storing unit 130 has stored the transmission data processing description information illustrated in FIG. 9 as well as the data processing description data illustrated in FIG. 25 for creating the transmission data that has a structure different from that of the transmission data processing description data illustrated in FIG. 9. When the data processing description data illustrated in FIG. 25 is specified as the transmission data processing description data to be used in step S131, steps S33-S36 are executed to create the transmission data illustrated in FIG. 26.

Several specific methods may be employed for specifying or determining the transmission data processing description data in step S131. For example, such a method may be employed that a plurality of transmission data processing description data stored in storing unit 130 are displayed for selection, and user's selection can be accepted. In another method, when the access information described in the transmission data processing description data includes the transmission method and the destination, reference is made to the description of the transmission data processing description data, and thereby the transmission data processing description data corresponding to the transmission method and the destination that are predetermined or selected is specified. When the input data saved in storing unit 130 is correlated to the transmission data processing description data, the transmission data processing description data corresponding to the reused input data may be automatically specified. In this case, storing unit 130 may store in advance the correlation between the input data and the transmission data processing description data saved in storing unit 130, and the corresponding input data saved in storing unit 130 may include information that specifies the transmission data processing description data. Further, such a manner may be employed that the input form data includes the information specifying the transmission data processing description data saved in storing unit 130 instead of the transmission data processing description data, and the transmission data processing description data is specified based on the information thus included.

By executing the above processing in cellular phone 1, the user is not required to perform the input operation again, or is merely required to perform a simple selection operation when the data previously entered is to be transmitted in the access method different from that for the previously entered data, and thereby the data of the same details can be easily transmitted in the predetermined access method.

Further, in step S35 of the transmission data write-out processing in step S24, rewrite processing of rewriting the character strings of the transmission data processing description data into a predetermined file may be executed in addition to (or instead of) the rewrite processing of replacing the character string of the transmission data processing description data with the character string of the attribute data.

More specifically, description will now be given on the processing of the input form data including the UI description data illustrated in FIG. 27 and the transmission data processing description data illustrated in FIG. 28.

UI processing unit 1312 executes the UI display processing in step S16 on the UI description data illustrated in FIG. 27 so that display 144 displays the user interface shown in FIG. 29. It is assumed that data illustrated in FIG. 30 is entered for each input item by the user (or by reusing the input data saved in storing unit 130). Thus, input of a file of photograph data is accepted for the input item "photograph" based on the UI description data illustrated in FIG. 26.

In this case, and particularly in step S35 of the transmission data write-out processing in step S24, the replacing processing is executed together with the character string rewrite processing based on the transmission data processing description data illustrated in FIG. 28.

More specifically, in step S31, UI processing unit 1312 extracts the data entered by the user and including a file "/picture/20040129.jpg" from the UI description data rewritten in step S23, and passes it to data saving unit 1313. Data saving unit 1313 assigns a file name "20040129.jpg" to the received file "/picture/20040129.jpg", and stores it in a predetermined region of storing unit 130 as an attribute value corresponding to the identifier "photo" indicating the attribute name.

In this operation, the data format of the data that is entered by the user and is extracted in step S31 complies with the transmission method and, for example, is a multipart/form-data format or a multipart/mixed format. In step S32, storing unit 130 saves each piece of the extracted input data in the data format illustrated in FIG. 31. More specifically, the type of the attribute is defined in step S32. When the input data is a file, the type of the attribute is defined as the file name, and the file name is stored as the attribute value thereof.

In step S35, transmission data processing unit 1314 extracts the file of the file name "20040129.jpg" from storing unit 130 as the attribute value corresponding to the identifier "photo" that indicates the attribute name and is included in the transmission data processing description data illustrated in FIG. 28. Further, transmission data processing unit 1314 writes the file of the file name "20040129.jpg" over the unit of the description "${photo}" in the 6th line of the transmission data processing description data. In step S36, processing is performed to write out the transmission data including the contents of the file of the file name "20040129.jpg". More specifically, the units in question of the transmission data processing description data illustrated in FIG. 28 are changed into the file and the character string of the file name "20040129.jpg", and the transmission data illustrated in FIG. 32 is written out.

By executing the above processing in cellular phone 1, it is possible to transmit readily the various files of character strings as well as photographs, sounds and the like in the predetermined access method. Likewise, the files of the photographs, sounds and the like that were previously input can be processed to transmit readily the data of the same details in the predetermined access method only by the simple selecting operation without performing the input operation again. Therefore, the processing is effective for the case of transmitting the data for an entry for a prize competition to server 2 accepting the prize competition entries as already described in connection with the embodiment, and further is effected for the case, e.g., where client device 1 transmits data to be printed to a printer in an access method peculiar to this printer, and generally for the case where client device 1 transmits data to a predetermined data processing device in an access method, e.g., of a specific format for executing specific processing on it.

The foregoing data processing method may be provided as a program. This program may be recorded on a computer-readable record medium such as a flexible disk, CD-ROM, ROM (Read Only Memory), RAM (Random Access Memory) and memory card handled by a computer, and may be provided as a program product. Also, the program may be recorded on a record medium such as a hard disk arranged in the computer for providing the program. Further, the program may be provided by downloading over the network.

The program product thus provided is installed on a program storing unit such as a hard disk for execution. The program product includes the program itself and the record medium bearing the program.

Although the present invention has been described and illustrated in detail, it is clearly understood that the same is by way of illustration and example only and is not to be taken by way of limitation, the spirit and scope of the present invention being limited only by the terms of the appended claims.

INDUSTRIAL APPLICABILITY

According to the invention, data can be transmitted in a predetermined access method without a complicated operation when the data is to be transmitted to another data processing device for executing it, and the invention can be effectively applied to the data processing device performing the data transmission, the data processing method and the data processing program product.

The invention claimed is:

1. A data processing device comprising:
   a data structure information obtaining unit obtaining from an external device data structure information including information defining a data structure of data to be transmitted to an other device;
   a user interface description data obtaining unit obtaining user interface description data indicating names of attributes of the data structure information for which data is to be collected for said data structure;
   an access information obtaining unit obtaining access information defining at least one of a method of transmitting data to said other device and a destination;
   a user interface processing unit processing said user interface description data to output a user interface for collecting, by a user's operation, data corresponding to attributes in the data structure information;
   a storing unit storing the data collected from the user by said user interface as an attribute value of an attribute name included in said user interface description data; and
   a transmission data processing unit determining a matching relationship between an attribute name included in said data structure information and the attribute name included in said user interface description data, creating the data to be transmitted to said other device by replacing a data unit in said data structure information corresponding to the matched attribute with said attribute value, and transmitting said created data based on said access information.

2. The data processing device according to claim 1, wherein
   said transmission data processing unit determines the matching relationship between said attribute name included in said data structure information and said attribute name included in said user interface description data, saving said data obtained based on said user interface description data as a file, creating said data to be transmitted to said other device by handling the data as an attribute value and replacing a corresponding unit in said data structure information with said attribute value and transmitting said created data to said other device.

3. The data processing device according to claim 1, wherein
   when said attribute name included in said data structure information and included in said user interface description data is a file, said transmission data processing unit saves said data obtained based on said user interface description data as a file of said attribute name, thereby creates said data to be transmitted to said other device and transmits the created data.

4. The data processing device according to claim 1, wherein
   said data structure information obtaining unit obtains said data structure information from an other device.

5. The data processing device according to claim 1, wherein
   said access information obtaining unit obtains said access information from an other device.

6. The data processing device according to claim 1, wherein
   said user interface description data obtaining unit obtains said user interface description data from an other device.

7. The data processing device according to claim 1, wherein
   Said data structure information obtaining unit obtains a plurality of pieces of the data structure information, and
   said data processing device further comprises a data structure information selecting unit selecting predetermined data structure information to be used for transmitting the data to said other device from among said plurality of pieces of said data structure information.

8. The data processing device according to claim 1, wherein
   said access information obtaining unit obtains a plurality of pieces of the access information, and
   said data processing device further comprises an access information selecting unit selecting predetermined access information to be used for transmitting data to said other device from among said plurality of pieces of the access information.

9. The data processing device according to claim 1, further comprising:
   a transmission data selecting unit selecting predetermined data to be transmitted to said other device from among the plurality of pieces of the data stored in said storing unit.

10. The data processing device according to claim 9, wherein
    the data stored in said storing unit includes data corresponding to each item, and
    said data stored in said storing unit includes data classified by items,
    when a plurality of the data are corresponding to one of said items, said transmission data selecting unit exhibits, for each of said items corresponding to said plurality of the data, said plurality of the data corresponding to said item, and selects one of said plurality of the data to be correlated to said item.

11. The data processing device according to claim 9, wherein
    the data stored in said storing unit is formed of a combination of the data pieces corresponding to the respective items, and
    said data stored in said storing unit includes a combination having data classified by items,
    when said storing unit stores a plurality of the combinations, said transmission data selecting unit exhibits the data for each of at least one of said items in the combination which is capable of identifying the combination, and selects one of said plurality of the combinations which is a predetermined data to be transmitted to said other device.

12. The data processing device according to claim 1, wherein
    data stored in said storing unit is a history of inputs by a user.

13. A data processing program stored on a computer readable medium for causing a computer to execute a data processing for transmitting data to an other device, causing the computer to execute:
    a data structure information obtaining step of obtaining from an external device data structure information including information defining a data structure of data to be transmitted to said other device;
    a user interface description data obtaining step of obtaining user interface description data indicating attributes of the data structure information for which data is to be collected for said data structure;

an access information obtaining step of obtaining access information defining at least one of a method of transmitting data to said other device and a destination;

a user interface processing step of processing said user interface description data to output said user interface for collecting, by a user's operation, data corresponding to attributes in the data structure information;

a storing step of storing in a storing unit data collected from the user by said user interface as an attribute value of an attribute name included in said user interface description data; and a transmission data processing unit of determining a matching relationship between an attribute name included in said data structure information and said attribute name included in said user interface description data, creating the data to be transmitted to said other device by replacing a data unit in said data structure information corresponding to the matched attribute with said attribute value, and transmitting the created data based on said access information.

14. The data processing device according to claim 1, wherein the user interface description data is obtained by analyzing a syntax of the data structure information.

* * * * *